Dec. 30, 1924.

R. M. KNIGHT

GRAVITY FEED OILER

Filed April 11, 1923

1,521,109

INVENTOR.
RICHARD M. KNIGHT.
BY HIS ATTORNEY

Patented Dec. 30, 1924.

1,521,109

UNITED STATES PATENT OFFICE.

RICHARD M. KNIGHT, OF MINNEAPOLIS, MINNESOTA.

GRAVITY-FEED OILER.

Application filed April 11, 1923. Serial No. 631,296.

*To all whom it may concern:*

Be it known that I, RICHARD M. KNIGHT, a citizen of the United States, residing at Minneapolis, in the county of Hennepin and State of Minnesota, have invented certain new and useful Improvements in Gravity-Feed Oilers; and I do hereby declare the following to be a full, clear, and exact description of the invention, such as will enable others skilled in the art to which it appertains to make and use the same.

This invention relates to an automobile of the Ford or similar type and particularly to a lubricating device therefor. In such automobiles there is usually provided a pipe or conduit which extends longitudinally inside of the crank shaft casing, said pipe being connected at one end so that oil is splashed thereinto and carried to the other end of the casing where it is discharged by the pipe onto some of the gears. It is difficult or impossible to tell whether or not oil is flowing through this pipe or whether it has become clogged. As it is necessary to have the gears properly lubricated considerable damage may be done if the pipe becomes clogged without the knowledge of the operator.

It is an object of this invention, therefore, to provide means for receiving the splashed oil and a conduit for conveying the same to one end of the crank casing, which conduit is disposed on the exterior of the casing and provided with means for readily ascertaining whether or not oil is flowing therethrough.

It is a further object of the invention to provide such a device comprising a casing adapted to be secured to the exterior of the crank casing at one end thereof and over an aperture in the crank casing to which first mentioned casing the oil conduit is connected, said conduit extending downwardly longitudinally of the crank casing and extending into the other end thereof for discharging the oil on the gears.

These and other objects and advantages of the invention will be fully set forth in the following description made in connection with the accompanying drawings in which like reference characters refer to the same parts throughout the different views, and in which, Fig. 1 shows the crank casing of an automobile of the Ford type and adjacent parts and also shows the device of the invention applied thereto;

Figure 1:
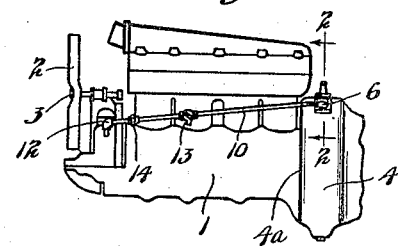

Referring to the drawings, in Fig. 1 the crank casing of an automobile of the Ford or similar type is illustrated as 1. Some of the adjacent parts, such as the cooling fan 2 and fan shaft 3 are also shown. The crank casing 1 has a cylindrical portion 4 at one end and, as is well known, oil is contained in the crank casing and splashed violently about therein by the revolving crank shaft and other parts. In accordance with the present invention, an aperture 5 is formed adjacent the top of the portion 4 of the crank casing and another casing 6 having a semi-circular attaching flange 7 is bolted or otherwise suitably secured to the exterior of the portion 4 of the crank casing. Said casing 6 has a flange or rib 7ª extending thereacross illustrated as of substantially triangular shape, which flange is disposed adjacent the aperture 5. The casing 6 thus overlies the aperture 5 and an oil holding pocket is formed at one side of the flange 7 by the top wall of the crank casing, the wall of the casing 6 and the flange 7. The casing 6 is provided at one end with slightly projecting hubs through which extend tapped holes 8. The casing is provided with a tapped hole at each side so that the same can be used at either side of the crank casing. The hole which is not used is closed by a plug 9 of ordinary type. A pipe 10 is screwed into the tapped hole 8 and extends downwardly along the side of the crank casing 1 at the exterior thereof, said pipe having a portion 11 at its other end extending substantially at right angles thereto and connected to the main portion 10 by a suitable elbow 12. A pet cock 13 is disposed in the pipe 10 and forms a means for ascertaining whether or not oil is flowing therethrough. A coupling 14 preferably is used in the pipe for convenience of assembling. The pipe section 11 extends downwardly and is tapped into the front end of the crank casing 1 so as properly to discharge the oil onto the gears to be lubricated.

Figure 2:
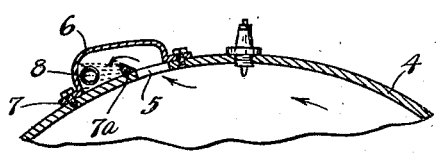
Fig. 2 is a vertical section taken on the line 2—2 of Fig. 1 shown on an enlarged scale.
Figure 3:
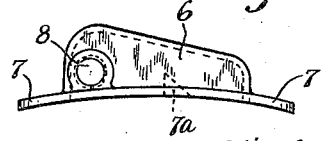
Fig. 3 is a view in end elevation of the casing used.
Figure 4:
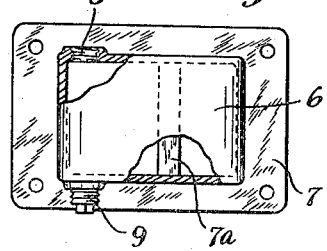
Fig. 4 is a plan view partly in section of said casing.

In operation, the oil will be splashed in the crank casing by the revolving parts therein in the general direction indicated by the arrows in Fig. 2 and some of this oil will pass through the aperture 5 and collect in the pocket described in casing 6. This oil will then flow downward through the pipe 10 and the portion 11 and will be discharged on the gears in the crank casing. The handle of the pet cock 13 can be turned when desired to ascertain if the oil is properly flowing through the pipe. If oil is flowing it will, of course, issue from said pet cock.

Figure 5:
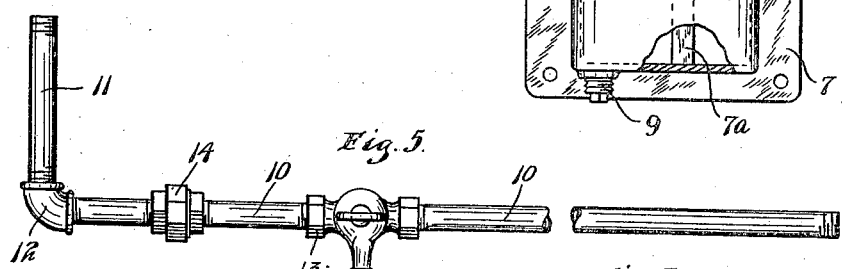
Fig. 5 is a view in side elevation of the conduit used.
Figure 6:
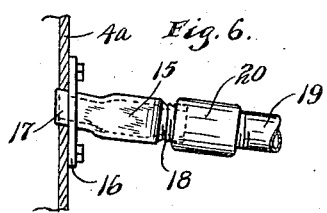
Fig. 6 is a view in end elevation of a modified form of casing showing the same attached to the crank casing.
Figure 7:
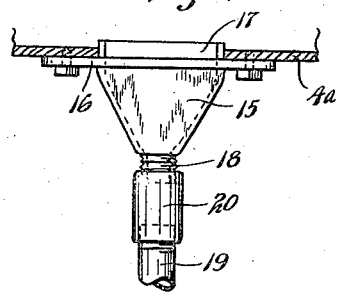
Fig. 7 is a plan view of the casing shown in Fig. 6 also showing a portion of the crank casing.

In Figs. 6 and 7 is shown a casing 15 having a flange 16 adapted to be bolted against the flat side 4ᵃ of the portion 4 of the crank casing. Said casing has a neck or lip 17 projecting slightly into the crank casing through an opening therein and adapted to collect the splashed oil. Said casing 15, as shown in Fig. 7, is of considerable width and tapers outside of the crank casing to a smaller width and has a nozzle 18 at its outer end. This nozzle is adapted to be connected to a pipe 19 by a coupling 20. The pipe 19 corresponds to the pipe 10 shown in Figs. 1 and 5 and will have the same parts connected thereto as the pipe 10 so that the oil will be discharged again into the crank casing.

It is thought the operation of the modification shown in Figs. 6 and 7 will be obvious without further description.

From the above description it is seen that applicant has provided a simple and efficient attachment for the automobile and by means of which it can readily be ascertained whether or not the proper lubrication is going on. The parts can be provided for attachment to the usual tube furnished which is disposed on the inside of the crank casing or said tube may be dispensed with. It will be noted that there is a small pocket or recess formed in the casing 6 below the pipe 10. Any particles of metal or other heavy sediment will be caught and retained in said pocket so that only clean oil will be delivered to pipe 10, and the possibility of said pipe being clogged will be lessened. Said pocket in the actual device is of considerable depth. The parts of applicant's device are few and simple and can be applied with small expense to all automobiles of the Ford or similar types.

It will, of course, be understood that various changes may be made in the form, details, proportions and arrangement of the parts without departing from the scope of applicant's invention, which, generally stated, consists in a device capable of carrying out the objects above enumerated, and such as shown and described and set forth in the appended claim.

What is claimed is:

A combination with a crank case of an internal combustion engine of a lubricating attachment comprising an open-bottomed casing having a transverse flange across the bottom thereof of triangular cross section, said crank case having an aperture in the top thereof over which said casing is secured to the top of said crank case with said flange positioned just below said aperture forming, with the top of said crank case and the wall of said casing, an oil holding pocket and a pipe secured to one side of said casing and extending downwardly and longitudinally of said casing at the exterior thereof and discharging into the other end of said crank case.

In testimony whereof I affix my signature.

RICHARD M. KNIGHT.